(12) United States Patent
Dominic et al.

(10) Patent No.: US 10,745,054 B2
(45) Date of Patent: Aug. 18, 2020

(54) GUSSET ASSEMBLIES AND VEHICLES INCLUDING GUSSET ASSEMBLIES

(71) Applicant: Toyota Motor Engineering & Manufacturing North America, Inc., Plano, TX (US)

(72) Inventors: Justin E. Dominic, Milan, MI (US); Christopher R. Cater, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 17 days.

(21) Appl. No.: 16/169,518

(22) Filed: Oct. 24, 2018

(65) Prior Publication Data

US 2020/0130748 A1    Apr. 30, 2020

(51) Int. Cl.
*B62D 21/15* (2006.01)
*B62D 25/04* (2006.01)
*B62D 25/20* (2006.01)

(52) U.S. Cl.
CPC ........... *B62D 21/157* (2013.01); *B62D 25/04* (2013.01); *B62D 25/2036* (2013.01)

(58) Field of Classification Search
CPC .... B62D 21/157; B62D 25/02; B62D 25/025; B62D 25/04; B62D 25/2036
See application file for complete search history.

(56) References Cited

U.S. PATENT DOCUMENTS

| | | | |
|---|---|---|---|
| 5,671,968 A | 9/1997 | Masuda et al. | |
| 5,820,204 A * | 10/1998 | Masuda | B62D 21/157 |
| | | | 296/187.12 |
| 6,299,239 B1 | 10/2001 | Sagawa et al. | |
| 7,631,926 B2 | 12/2009 | Fonseka et al. | |
| 8,007,032 B1 | 8/2011 | Craig | |
| 2007/0063543 A1* | 3/2007 | Roccato | B62D 21/157 |
| | | | 296/187.08 |
| 2007/0152474 A1* | 7/2007 | Lassl | B62D 21/15 |
| | | | 296/187.12 |
| 2018/0065679 A1* | 3/2018 | Johnson | B62D 25/2036 |

(Continued)

FOREIGN PATENT DOCUMENTS

| | | |
|---|---|---|
| DE | 19531982 A1 | 3/1996 |
| EP | 2867097 B1 | 9/2016 |

OTHER PUBLICATIONS

"Crush Box"; accessed Aug. 17, 2018; URL: https://ttna/.com/body-parts/.

*Primary Examiner* — Gregory A Blankenship
(74) *Attorney, Agent, or Firm* — Dinsmore & Shohl LLP

(57) ABSTRACT

A gusset assembly of a vehicle that includes a pillar structure that extends in a vehicle vertical direction, a cross member that extends in a vehicle lateral direction, and a gusset positioned between and coupled to the pillar structure and the cross member. The gusset configured to transfer an impact load from the pillar structure to the cross member. The gusset assembly includes a gusset crushbox positioned between the pillar structure and the cross member, with the gusset crushbox disposed within the gusset. The gusset crushbox configured to deform to absorb a portion of the impact load applied to the pillar structure during a side impact and to distribute the impact load from the pillar structure to the cross member.

18 Claims, 5 Drawing Sheets

(56) References Cited

U.S. PATENT DOCUMENTS

| | | | |
|---|---|---|---|
| 2018/0237074 A1* | 8/2018 | Yoshitake | B62D 25/02 |
| 2019/0009834 A1* | 1/2019 | Kageyama | B62D 25/025 |
| 2019/0106156 A1* | 4/2019 | Piper | B62D 25/06 |
| 2019/0161129 A1* | 5/2019 | Mika | B62D 27/023 |
| 2019/0276086 A1* | 9/2019 | Onishi | B62D 25/025 |
| 2019/0359260 A1* | 11/2019 | Tsuyuzaki | B62D 21/157 |

* cited by examiner

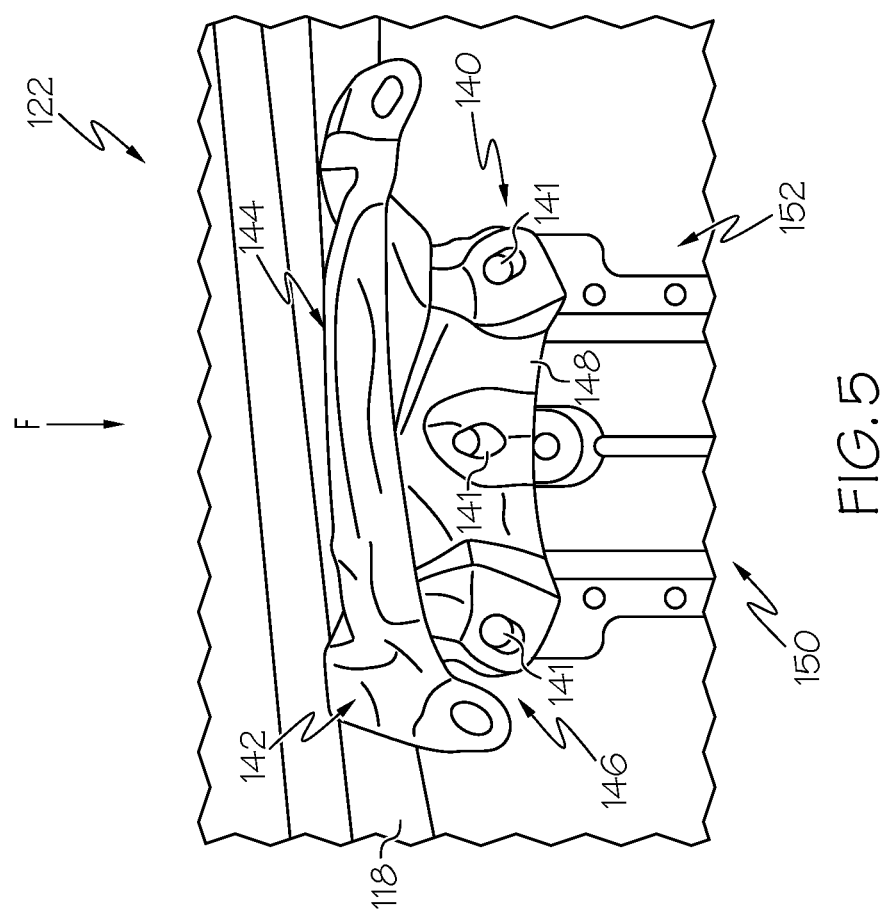

GUSSET ASSEMBLIES AND VEHICLES INCLUDING GUSSET ASSEMBLIES

TECHNICAL FIELD

The present specification generally relates to gusset assemblies for a vehicle, and more particularly, gusset assemblies including a gusset crushbox positioned between a gusset and a cross member of a vehicle.

BACKGROUND

Vehicles may be equipped with structures that absorb and direct forces and/or energy associated with an impact. The vehicle structures divert and absorb the energy associated with the impact into energy that deforms the vehicle structures. The vehicle structures may be designed to accommodate the introduction of the energy of the impact, such that the energy associated with the impact may be controllably dissipated and directed through selective and preferential deformation of the vehicle structures.

In one example, a vehicle may include a side pillar assembly. The side of the vehicle may be struck by an object or barrier in what is referred to herein as a side impact. In a side impact, the object or barrier may strike the side of the vehicle in the vehicle lateral direction, which may cause the side pillar assembly to deform and intrude into the cabin of the vehicle.

Accordingly, a need exists for alternative structures for directing energy associated with a side impact to minimize intrusion of the side pillar assembly into the cabin of the vehicle.

SUMMARY

In one embodiment, a gusset assembly of a vehicle comprises a pillar structure that extends in a vehicle vertical direction, a cross member that extends in a vehicle lateral direction, and a gusset positioned between and coupled to the pillar structure and the cross member. The gusset configured to transfer an impact load from the pillar structure to the cross member. The gusset assembly further includes a gusset crushbox positioned between the beam support structure and the cross member, the gusset crushbox disposed within the gusset. The gusset crushbox configured to deform to absorb a portion of an impact load applied to the pillar structure during a side impact and to distribute the impact load from the pillar structure to the cross member.

In another embodiment, a vehicle comprises a pillar structure that extends in a vehicle vertical direction, a cross member that extends in a vehicle lateral direction, and a gusset positioned between and coupled to the pillar structure and the cross member. The gusset configured to transfer an impact load from the pillar structure to the cross member. The vehicle further includes a gusset crushbox positioned between the beam support structure and the cross member, and the gusset crushbox disposed within the gusset. The gusset crushbox configured to deform to absorb a portion of an impact load applied to the pillar structure during a side impact and to distribute the impact load from the pillar structure to the cross member.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 schematically depicts a top plan view of the gusset of FIG. 2 in a deformed state according to one or more embodiments shown and described herein.

DETAILED DESCRIPTION

Gusset assemblies and vehicles including gusset assemblies are disclosed herein. In one embodiment, a gusset assembly includes a gusset crushbox positioned between a pillar structure and a cross member of the vehicle. The pillar structure extends in a vehicle vertical direction and the cross member extends in a vehicle lateral direction. The gusset crushbox is disposed within a gusset of the vehicle that is positioned between and coupled to the pillar structure and the cross member. The gusset is configured to transfer an impact load from the pillar structure to the cross member, and the gusset crushbox is configured to deform to absorb a portion of the impact load applied to the pillar structure during a side impact and to distribute the impact load from the pillar structure to the cross member.

As used herein, the term "vehicle longitudinal direction" refers to the forward-rearward direction of the vehicle (i.e., in the +/− vehicle X-direction as depicted). The term "vehicle lateral direction" refers to the cross-vehicle direction of the vehicle (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted). Further, the terms "inboard" and "outboard" are used to describe the relative positioning of various components of the vehicle. The term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle 100 may be generally symmetrical about the vehicle centerline 10, the terms "inboard" and "outboard" may be switched when evaluating components positioned along opposite sides of the vehicle 100. Further, while certain components of the vehicle 100 are described as extending in one of the identified directions or oriented toward one of the identified directions, it should be understood that these components extend or are oriented in at least these recited directions.

Motor vehicles that incorporate elements according to the present disclosure may include a variety of construction methodologies that are conventionally known, including the unibody construction methodology as depicted, as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Figure 1:
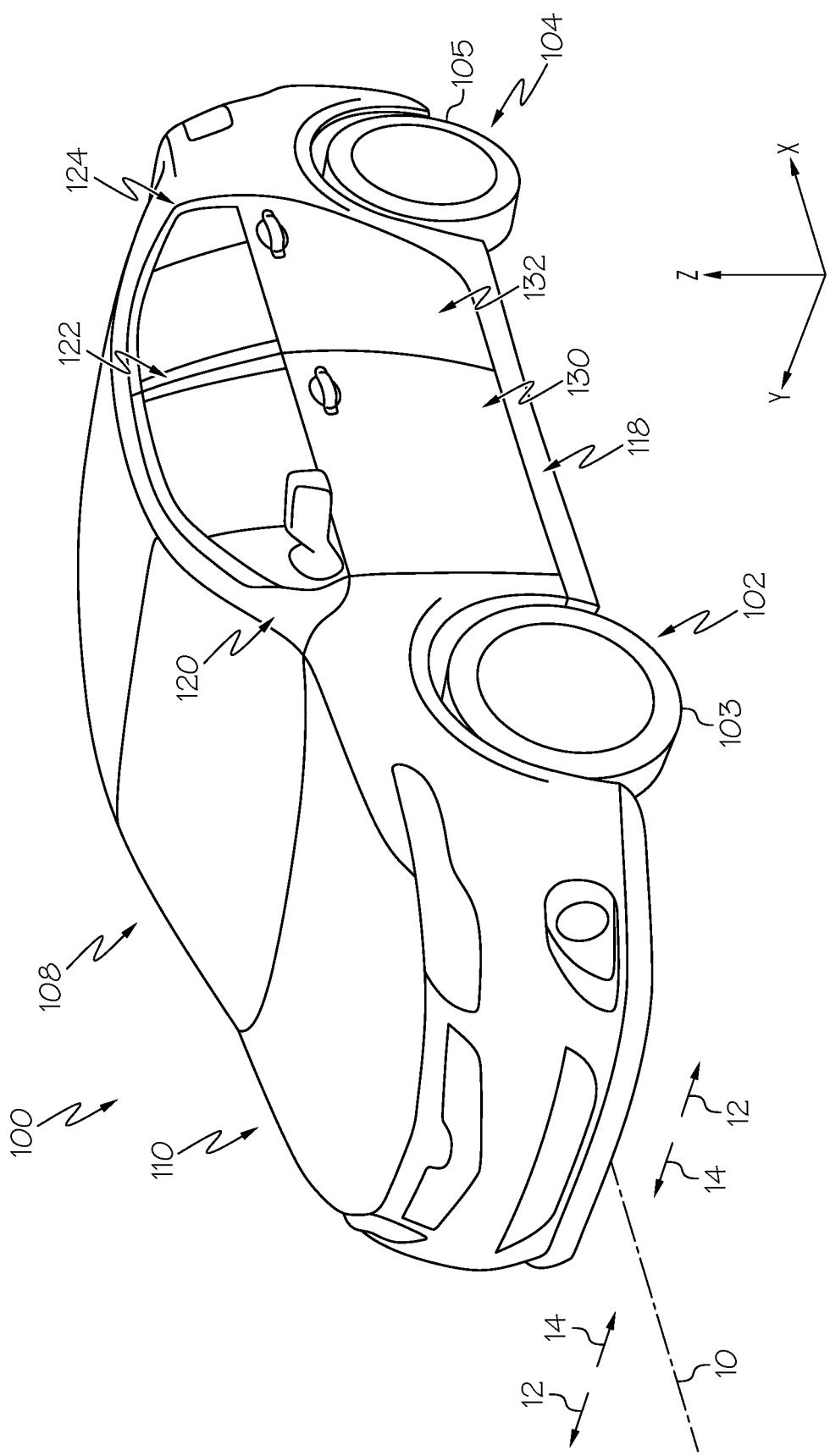
FIG. 1 schematically depicts a perspective view of a vehicle including a front door assembly and a rear door assembly according to one or more embodiments shown or described herein.

Referring to FIG. 1, a vehicle 100 is depicted. The vehicle 100 includes a body 110 onto which a vehicle drivetrain is coupled. The vehicle 100 also includes a cabin 108 that is integral with the body 110. The cabin 108 generally defines a passenger cabin of the vehicle 100. The body 110 includes a rocker support 118 that extends in the vehicle longitudinal direction between a front suspension unit 102 and a rear suspension unit 104. The front suspension unit 102 and the rear suspension unit 104 include various components that connect a front tire 103 and a rear tire 105 to the body 110.

The body 110 includes one or more pillar structures, such as an A-pillar 120, a B-pillar 122, and a C-pillar 124 that extend upward from the rocker support 118 in the vehicle vertical direction. The A-pillar 120 is positioned forward of the B-pillar 122 and the B-pillar 122 is positioned forward of the C-pillar 124. Other bodies may include additional pillar structures, such as a D-pillar and E-pillar. As used herein the terms "forward pillar assembly" and "rearward pillar assembly" are used to refer to the relative location of the A-pillar 120, B-pillar 122, and the C-pillar 124 with respect to one another. For example, in one embodiment, the A-pillar 120 is a forward pillar assembly and the B-pillar 122 is a rearward pillar assembly that is positioned rearward of the forward pillar assembly in the vehicle longitudinal direction. In embodiments, the B-pillar 122 can be the forward pillar assembly and the C-pillar 124 can be the rearward pillar assembly that is positioned rearward of the forward pillar assembly in the vehicle longitudinal direction.

The vehicle 100 includes one or more door assemblies coupled to the body 110 of the vehicle 100. A front door assembly 130 is coupled to the A-pillar 120 and a rear door assembly 132 is coupled to the B-pillar 122. In some embodiments, the front door assembly 130 is hingedly coupled to the A-pillar 120 and the rear door assembly 132 is hingedly coupled to the B-pillar 122. In other embodiments, the rear door assembly 132 may be severally coupled to the B-pillar 122, such as when the rear door assembly 132 is sliding door or when the rear door assembly 132 is hingedly coupled to the C-pillar 124 (i.e., a rear-hinged door). The front door assembly 130 and the rear door assembly 132 facilitate ingress and egress to the cabin 108 of the vehicle 100.

Figure 2:
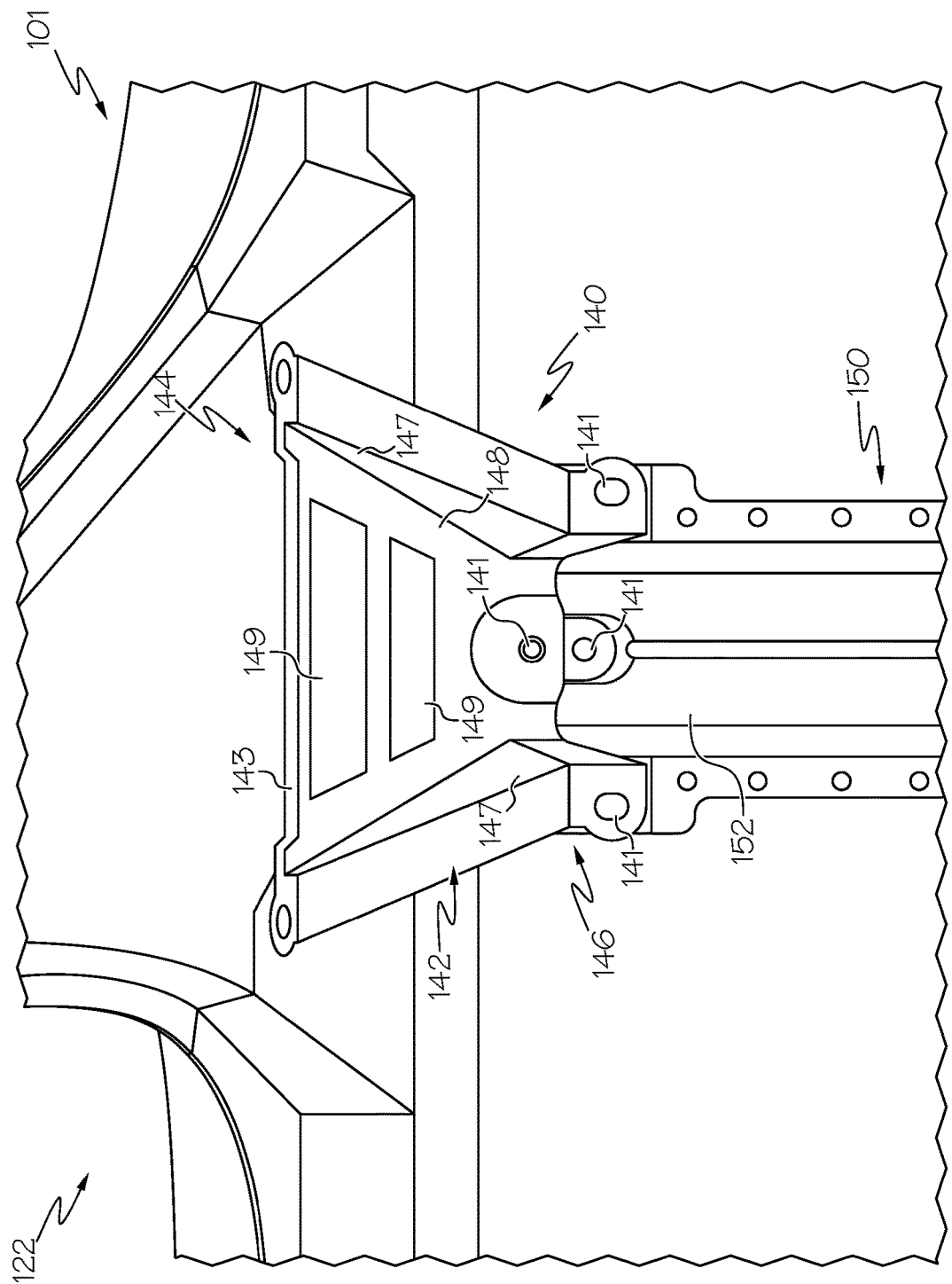
FIG. 2 schematically depicts a top view of a gusset assembly that includes a gusset secured to a side pillar structure and a cross member in a undeformed state according to one or more embodiments shown and described herein.
Figure 4:
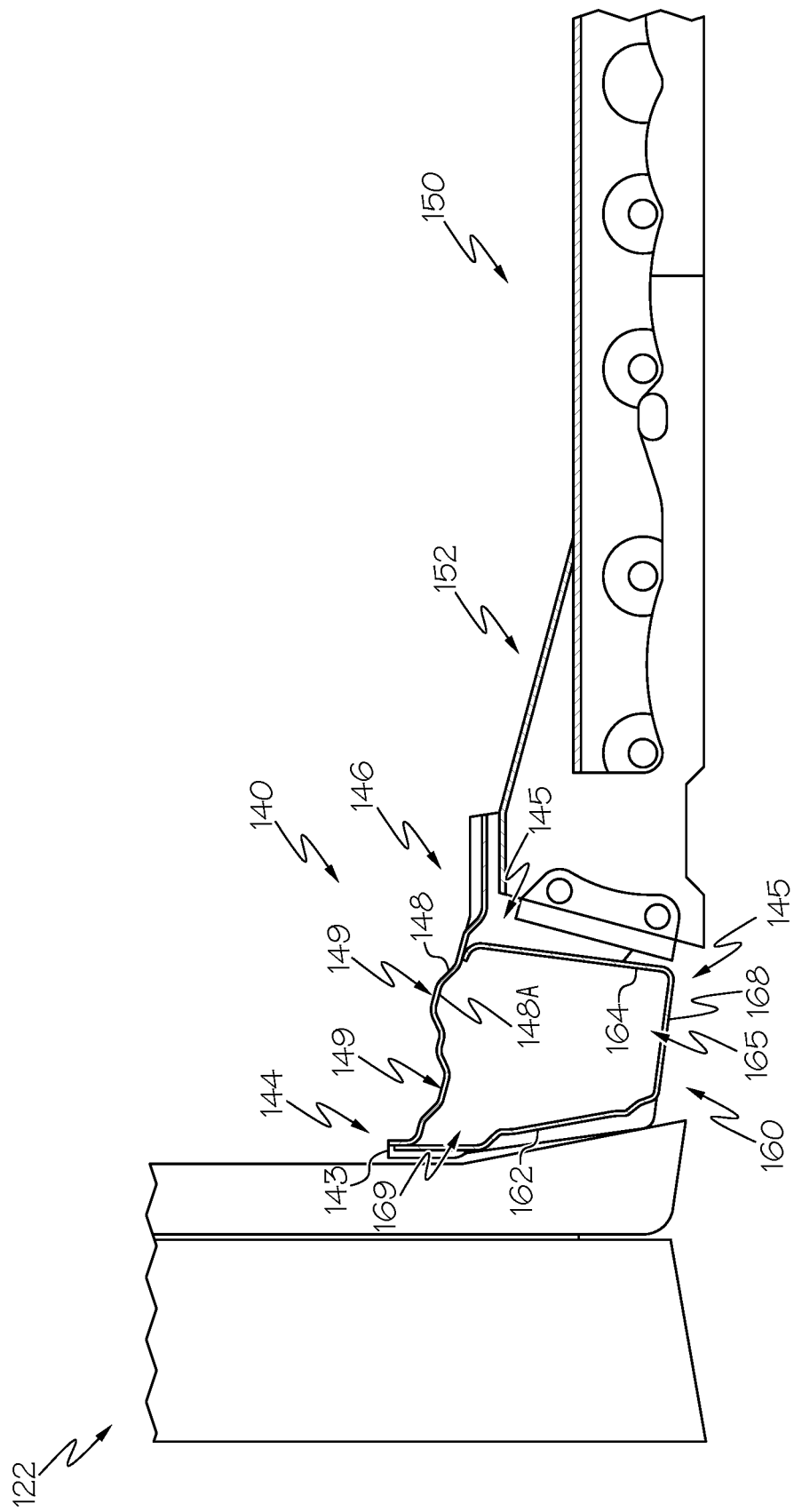
FIG. 4 depicts schematically depicts a partial cross section view of the gusset assembly of FIG. 3 according to one or more embodiments shown and described herein.

Referring to FIG. 2, the vehicle 100 may further include one or more gussets assemblies 101. The gusset assembly 101 includes a gusset 140, a pillar structure, such as the B-Pillar 122, a cross member 150, and a gusset crushbox 160. The gusset 140 includes a body 142 that extends between a first end 144 and a second end 146. The body 142 of the gusset 140 includes a pair of sidewalls 147 and a top wall 148 disposed between the pair of sidewalls 147. The pair of sidewalls 147 extends downwardly from the top wall 148 in the vehicle vertical direction, and the pair of sidewalls 147 and the top wall 148 extend along a longitudinal length between the first end 144 and the second end 146 in the vehicle lateral direction. The pair of sidewalls 147 and the top wall 148 of the body 142 define a cavity 145, as shown in FIG. 4, therebetween and within the body 142 of the gusset 140. The gusset 140 is secured to the B-pillar 122 at the first end 144 of the body 142.

The body 110 of the vehicle 100 may further include one or more cross members 150 extending across the rocker support 118 in the vehicle lateral direction. It should be understood that the one or more cross members 150 of the vehicle 100 provide structural support to the body panels of the body 110 and the rocker support 118 in response to the various potential loads generally applied to the body 110 during operation of the vehicle 100.

In the present example, the cross member 150 includes a first end 152 secured to the gusset 140 at the second end 146 of the body 142. Accordingly, the gusset 140 is positioned between and coupled to the B-pillar 122 at the first end 144 and the cross member 150 at the second end 146. The gusset 140 may be securely coupled to the B-pillar 122 and the cross member 150 by various fastening members, including but not limited to, welding spots, screws, bolts, nails, and the like. In this instance, the gusset 140 includes a plurality of apertures 141 formed along the top wall 148 of the body 142, with the plurality of apertures 141 sized and shaped to receive a fastening member therein to secure the gusset 140 to the B-pillar 122 and the cross member 150, respectively.

The body 142 of the gusset 140 further includes a plurality of ridges 149 formed along the top wall 148. The plurality of ridges 149 are sized and shaped to provide a stiffness and/or rigidity to the body 142 of the gusset 140. In the present example, the body 142 of the gusset 140 includes two ridges 149 extending along the top wall 148 in the vehicle lateral direction, however, it should be understood that in other embodiments the body 142 may include additional or fewer ridges 149 along the top wall 148 and/or other surfaces of the gusset 140. In some embodiments, the plurality of ridges 149 protrude outwardly from the top wall 148 of the body 142 such that the plurality of ridges 149 extend above the top wall 148. Additionally or alternatively, in some other embodiments, the plurality of ridges 149 are depressed inwardly relative to the top wall 148 of the body 142 such that the plurality of ridges 149 are recessed below the top wall 148. It should further be understood that the ridges 149 of the gusset 140 may include various other sizes and/or shapes than that depicted and described herein. As will be described in greater detail herein, the plurality of ridges 149 are configured to selectively control a deformation of the body 142 of the gusset 140 during a side impact of the vehicle 100 at or near the B-pillar 122.

Figure 3:
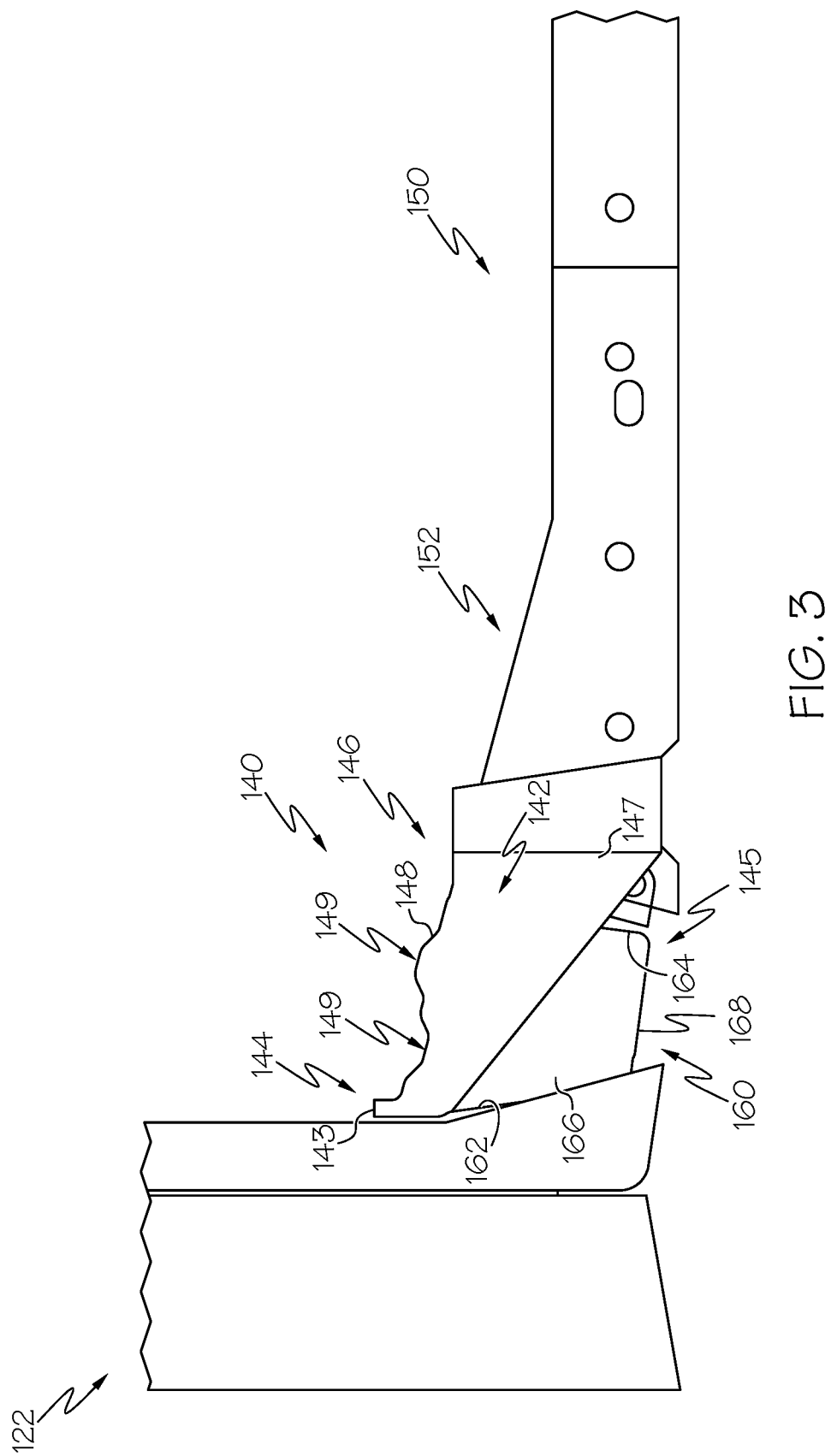
FIG. 3 schematically depicts a side view of the gusset assembly of FIG. 2 according to one or more embodiments shown and described herein.

Referring to FIGS. 3 and 4, a non-limiting example of the gusset crushbox 160 is illustrated. In the illustrated embodiment, the gusset crushbox 160 is positioned between the B-pillar 122 and the cross member 150, and in particular, is disposed within the cavity 145 defined by the body 142 of the gusset 140. The gusset crushbox 160 is sized and shaped to fit underneath the top wall 148 and between the pair of sidewalls 147 of the gusset 140 such that the gusset crushbox 160 is received within the body 142 of the gusset 140. The gusset crushbox 160 is coupled to the top wall 148 of the body 142 to thereby securely fix the gusset crushbox 160 to the gusset 140. In other embodiments, the gusset crushbox 160 is form fitted to an underside of the body 142 of the gusset 140 to thereby securely fix the gusset crushbox 160 therein. In some embodiments, the gusset crushbox 160 is secured to the body 110 of the vehicle 100 and/or to the body 142 of the gusset 140 to thereby securely fasten the gusset crushbox 160 therein. The gusset crushbox 160 may be formed of various materials, including but not limited to, steel, metal alloys, plastic, and/or the like. As will be described in greater detail herein, the gusset crushbox 160 is controllably shaped to increase a stiffness and/or rigidity of the gusset 140 when positioned beneath the gusset 140.

The gusset crushbox 160 includes an outer wall 162, an inner wall 164, and a pair of sidewalls 166 extending between the outer wall 162 and the inner wall 164 in the vehicle lateral direction. The gusset crushbox 160 further includes a bottom wall 168 extending between the outer wall 162 and the inner wall 164 in the vehicle lateral direction and disposed between the pair of sidewalls 166. Generally, the outer wall 162, the inner wall 164, and the pair of sidewalls 166 form a wedge-shape of the gusset crushbox 160 underneath the body 142 of the gusset 140. In particular, the outer wall 162 and the inner wall 164 are sized and shaped to fit within and between the first end 144 and the second end 146 of the body 142 of the gusset 140. Further, the pair of sidewalls 166 are sized and shaped to fit within and between the pair of sidewalls 147 of the body 142 of the gusset 140.

As best seen in FIG. 4, the outer wall 162 and the inner wall 164 of the gusset crushbox 160 extend upwardly relative to the pair of sidewalls 166 of the gusset crushbox 160 such that the outer wall 162 and the inner wall 164 terminate beyond a height of the pair of sidewalls 166. With the gusset crushbox 160 received within the cavity 145 defined by the body 142 of the gusset 140, the outer wall 162 of the gusset crushbox 160 is positioned adjacent to and/or against the B-pillar 122, proximate to the first end 144 of the gusset 140. The inner wall 164 is positioned adjacent to the cross member 150, relative to the outer wall 162, and is positioned against and/or proximate to the second end 146 of the gusset 140.

The inner wall 164 of the gusset crushbox 160 is coupled to an inner surface 148A of the top wall 148 of the gusset 140 to thereby securely fix the gusset crushbox 160 to the body 142 of the gusset 140 at the second end 146. In some embodiments, the inner wall 164 of the gusset crushbox 160 is welded to the inner surface 148A of the top wall 148 of the gusset 140. In some embodiments, a distal end of the inner wall 164 curves outwardly in the vehicle lateral direction to secure the inner wall 164 to the inner surface 148A of the top wall 148 of the gusset 140.

Further, the outer wall 162 of the gusset crushbox 160 is coupled to the inner surface 148A of the top wall 148 of the gusset 140 to thereby securely fix the gusset crushbox 160 to the body 142 of the gusset 140 at the first end 144. In some embodiments, the body 142 of the gusset 140 includes a flange 143 extending upwardly from the top wall 148 at the first end 144. In this instance, an upper edge of the outer wall 162 of the gusset crushbox 160 is positioned between the flange 143 of the gusset 140 and the B-pillar 122 of the vehicle 100. It should be understood that in some embodiments the outer wall 162 and/or the inner wall 164 of the gusset crushbox are welded to the first end 144 and/or the second end 146 of the body 142 of the gusset 140. In other embodiments, the outer wall 162, the inner wall 164, the pair of sidewalls 166 may include one or more reinforcing ribs extending thereon to securely fix the gusset crushbox 160 to the body 142 of the gusset 140.

In some embodiments, the gusset crushbox 160 defines an open top end 169 below an inner surface 148A of the top wall 148 of the gusset 140. Further, the outer wall 162, the inner wall 164, and the pair of sidewalls 166 collectively define an interior cavity 165 within the gusset crushbox 160. The interior cavity 165 defines a hollow void within the gusset crushbox 160 as shown in FIG. 4. As will be described in greater detail herein, the hollow void defined by the interior cavity 165 is substantially reduced in response to the application of a side impact onto the vehicle 100 at the B-pillar 122.

In some embodiments, the gusset crushbox 160 includes one or more ridge lines extending thereon which are sized and shaped to selectively control a deformation of the gusset crushbox 160 into the interior cavity 165 during a side impact at the B-pillar 122. As will be further described below, in other embodiments the interior cavity 165 may be filled with a deformable material such that the gusset crushbox 160 does not include a hollow void within the interior cavity 165.

Referring to FIG. 5, the inner wall 164 of the gusset crushbox 160 is positioned proximate to the first end 152 of the cross member 150 when the gusset crushbox 160 is disposed within the cavity 145 defined by the gusset 140. It should be understood that in other embodiments the inner wall 164 of the gusset crushbox 160 may abut against the first end 152 of the cross member 150 such that the gusset crushbox 160 is engaged with both the B-pillar 122 (at the outer wall 162) and the cross member 150 (at the inner wall 164).

When a vehicle is involved in an impact, vehicle structures may elastically and plastically deform to absorb energy. The vehicle structures divert and absorb the energy associated with the impact into energy that deforms the vehicle structures. The vehicle structures may be designed to accommodate the introduction of the energy of the impact, such that the energy associated with the impact may be controllably dissipated and directed through selective and preferential deformation of the vehicle structures. The side of the vehicle may be struck by an object or barrier in what is referred to herein as a side impact. In a side impact, the object or barrier may strike the side of the vehicle in the vehicle lateral direction.

In instances where a side impact is applied to the front door assembly 130 and/or the rear door assembly 132 of the vehicle 100 proximate to the B-pillar 122, the energy and/or forces associated with the side impact cause the B-pillar 122 to deform inboard in the vehicle lateral direction toward the gusset 140 and the cross member 150. With the gusset 140 having a hollow void within the cavity 145, the energy and/or load generated by the side impact is transferred from the B-pillar 122 to the cross member 150 solely via the gusset 140 positioned therebetween. Due to the presence of a hollow void within the cavity 145, positioned underneath the body 142 of the gusset 140, the body 142 of the gusset 140 endures a substantial portion of the load received at the B-pillar 122. In this instance, the gusset 140 is incapable of transferring the entire load to the cross member 150.

In these instances, the load transferred to the gusset 140 generally exceeds a load capacity of the body 142 such that the gusset 140 is substantially deformed. In response to the severe deformation of the gusset 140, the plurality of apertures 141 along the body 142, which include the plurality of fastening members received therein, are significantly deformed due to the shear stress endured thereon, which exceed a capacity of shear stress of the plurality of apertures 141 and/or the plurality of fastening members. Accordingly, the plurality of fastening members securing the gusset 140 to the B-pillar 122 and the cross member 150 are damaged, thereby decoupling the secure connection between the B-pillar 122 and the cross member 150 via the gusset 140 positioned therebetween. In this instance, with the deformation of the gusset 140, and in particular the plurality of apertures 141 holding the plurality of fastening members to the gusset 140, the B-pillar 122, and the cross member 150, the efficient distribution of the energy from the B-pillar 122 to the cross member 150 is inhibited.

Accordingly, the energy received at the B-pillar 122 is not efficiently transferred to the cross member 150. Rather, in this instance with the gusset crushbox 160 omitted from the vehicle 100, structure intrusion velocities into a cabin 108 of the vehicle 100 are relatively greater than instances where the gusset crushbox 160 is included in within the cavity 145 defined by the gusset 140. In contrast, with the gusset crushbox 160 positioned between the B-pillar 122 and the cross member 150, and in particular coupled to the gusset 140, the gusset crushbox 160 is capable of absorbing and distributing at least a portion of the energy received at the B-pillar 122 from the side impact. In particular, the gusset crushbox 160 fills the hollow void within the cavity 145 and is configured to support the gusset 140 in distributing the load of the side impact from the B-pillar 122 to the cross member 150. With the gusset crushbox 160 received therein, a strength requirement of the gusset 140 is effectively reduced as the gusset crushbox 160 serves to absorb at least a portion of the energy generated by the side impact.

Referring to FIG. 5, a side impact load F is applied at and/or adjacent to the B-pillar 122 of the body 110. In this instance, forces and/or energy associated with the impact causes the gusset crushbox 160 to deform laterally inward toward the cross member 150. In other words, the gusset crushbox 160 is configured to plastically and elastically deform to thereby absorb a portion of the force and/or energy from the B-pillar 122. Additionally, the gusset crushbox 160 serves to transfer at least a portion of the force and/or energy from the B-pillar 122 to the cross member 150 in conjunction with the gusset 140. In this instance, in response to the gusset crushbox 160 absorbing and/or transferring at least a portion of the load received from the B-pillar 122 in lieu of the gusset 140 solely receiving the energy thereon, a shear stress imparted on the plurality of apertures 141 and/or fastening members is reduced. As a result, at least a portion of the plurality of apertures 141, and the plurality of fastening members received therein, is maintained intact during the load transfer from the side impact F.

With the plurality of apertures 141 and fastening members at least partially maintained, the gusset 140 remains connected to and coupled with the B-pillar 122 and the cross member 150 during the side impact F. Accordingly, the gusset 140 is capable of efficiently transferring the load of the side impact F to the cross member 150 due to the continued connection of the gusset 140 to the cross member 150. As briefly described above, the gusset 140 includes one or more ridges 149 extending along the top wall 148 of the body 142 which are configured to selectively control a direction of deformation of the body 142 during the load transfer from the side impact F.

The gusset crushbox 160 further prolongs a duration of the load distribution from the side impact load F prior to the load being received at the gusset 140 and the cross member 150. By controlling a duration of the load distribution through the body 110 of the vehicle 100, and in particular from the B-pillar 122 to the cross member 150, the gusset crushbox 160 decreases a structural intrusion velocity of the body 110 of the vehicle 100 into the cabin 108.

In some embodiments, the interior cavity 165 defined by the outer wall 162, the inner wall 164, the pair of sidewalls 166 and a top wall. In some other embodiment, the interior cavity may be filled with the deformable material. In this instance, the gusset crushbox 160 does not include a hollow void within the interior cavity 165. Rather, the deformable material further provides enhanced force absorption and load distribution properties to the gusset crushbox 160. In particular, the deformable material disposed within the interior cavity 165 absorbs at least a portion of the energy and/or forces associated with the side impact load F received at the B-pillar 122 such that the shear stress endured by the body 142 of the gusset 140 is minimized. In this instance, the deformable material further prolongs a load distribution from the B-pillar 122 to the cross member 150, thereby further decreasing structural intrusion velocities of the body 110 of the vehicle 100 into the cabin 108. The deformable material may be formed of various materials, including but not limited to, elastomeric materials, plastic, steel, metal alloys, and the like.

In some other embodiments, the deformable material may be included within the open top end 169 disposed between the gusset crushbox 160 and the inner surface 148A of the top wall 148 of the gusset 140 to further enhance force absorption and load distribution of the gusset crushbox 160.

It should now be understood that vehicles according to the present disclosure include gusset assemblies. In embodiments, a gusset assembly of a vehicle includes a pillar structure that extends in a vehicle vertical direction, a cross member that extends in a vehicle lateral direction, and a gusset positioned between and coupled to the pillar structure and the cross member. The gusset is configured to transfer an impact load from the pillar structure to the cross member. The gusset assembly further includes a gusset crushbox positioned between the pillar structure and the cross member, and in particular the gusset crushbox is disposed within the gusset. The gusset crushbox being configured to deform and to absorb a portion of the impact load applied to the pillar structure during a side impact, and to distribute the impact load from the pillar structure to the cross member.

It is noted that the terms "substantially" and "partially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A gusset assembly of a vehicle, the gusset assembly comprising:
  a pillar structure that extends in a vehicle vertical direction;
  a cross member that extends in a vehicle lateral direction;
  a gusset having a top wall, the gusset positioned between and coupled to the pillar structure and the cross member, the gusset configured to transfer an impact load from the pillar structure to the cross member; and
  a gusset crushbox positioned between the pillar structure and the cross member, the gusset crushbox disposed within the gusset and coupled to the top wall of the gusset, wherein the gusset crushbox configured to deform to absorb a portion of the impact load applied to the pillar structure during a side impact and to distribute the impact load from the pillar structure to the cross member.

2. The gusset assembly of claim 1, wherein the gusset includes a pair of side walls that extend downwardly from the top wall in the vehicle vertical direction, the top wall and the pair of side walls defines a cavity, wherein the gusset crushbox is positioned within the cavity of the gusset.

3. The gusset assembly of claim 1, wherein the gusset crushbox includes an outer wall, an inner wall, and a pair of side walls that extend between the outer wall and the inner wall, the outer wall and the inner wall extend upwardly beyond the pair of side walls.

4. The gusset assembly of claim 3, wherein the outer wall of the gusset crushbox is positioned adjacent the pillar structure and the inner wall of the gusset crushbox is positioned adjacent the cross member.

5. The gusset assembly of claim 4, wherein the inner wall of the gusset crushbox is coupled to an inner surface of the top wall of the gusset.

6. The gusset assembly of claim 5, wherein the top wall of the gusset includes an upwardly extending flange, and wherein an upper edge of the outer wall of the gusset crushbox is positioned between the upwardly extending flange of the top wall of the gusset and the pillar structure.

7. The gusset assembly of claim 6, wherein the gusset crushbox includes an open top end and an interior cavity formed by the outer wall, the inner wall, and the pair of side walls.

8. A vehicle comprising:
a pillar structure that extends in a vehicle vertical direction;
a cross member that extends in a vehicle lateral direction;
a gusset having a top wall, the gusset positioned between and coupled to the pillar structure and the cross member, the gusset configured to transfer an impact load from the pillar structure to the cross member; and
a gusset crushbox positioned between the pillar structure and the cross member, the gusset crushbox disposed within the gusset and coupled to the top wall of the gusset, wherein the gusset crushbox configured to deform to absorb a portion of an impact load applied to the pillar structure during a side impact and to distribute the impact load from the pillar structure to the cross member.

9. The vehicle of claim 8, wherein the gusset includes a pair of side walls that extend downwardly from the top wall in the vehicle vertical direction, the top wall and the pair of side walls defines a cavity, wherein the gusset crushbox is positioned within the cavity of the gusset.

10. The vehicle of claim 8, wherein the gusset crushbox includes an outer wall, an inner wall, and a pair of side walls that extend between the outer wall and the inner wall, the outer wall and the inner wall extend upwardly beyond the pair of side walls.

11. The vehicle of claim 10, wherein the outer wall of the gusset crushbox is positioned adjacent the pillar structure and the inner wall of the gusset crushbox is positioned adjacent the cross member.

12. The vehicle of claim 11, wherein the inner wall of the gusset crushbox is coupled to an inner surface of the top wall of the gusset.

13. The vehicle of claim 12, wherein the top wall of the gusset includes an upwardly extending flange, and wherein an upper edge of the outer wall of the gusset crushbox is positioned between the upwardly extending flange of the top wall of the gusset and the pillar structure.

14. The vehicle of claim 13, wherein the gusset crushbox includes an open top end and an interior cavity formed by the outer wall, the inner wall, and the pair of side walls.

15. A gusset assembly of a vehicle, the gusset assembly comprising:
a pillar structure that extends in a vehicle vertical direction;
a cross member that extends in a vehicle lateral direction;
a gusset positioned between and coupled to the pillar structure and the cross member, the gusset configured to transfer an impact load from the pillar structure to the cross member; and
a gusset crushbox having an open ended top, the gusset crushbox positioned between the pillar structure and the cross member, the gusset crushbox disposed within the gusset, wherein the gusset crushbox configured to deform to absorb a portion of the impact load applied to the pillar structure during a side impact and to distribute the impact load from the pillar structure to the cross member.

16. The gusset assembly of claim 15, wherein the gusset crushbox includes an interior cavity.

17. The gusset assembly of claim 16, wherein the interior cavity of the gusset crushbox is accessible through the open ended top.

18. The gusset assembly of claim 15, wherein the gusset includes a top wall and the gusset crushbox is coupled to the top wall of the gusset.

* * * * *